United States Patent
Li et al.

(10) Patent No.: US 9,436,730 B2
(45) Date of Patent: Sep. 6, 2016

(54) METHODS AND SYSTEMS FOR VALIDATING INPUT DATA

(75) Inventors: Mingyan Li, Redmond, VA (US); Changzhou Wang, Bellevue, WA (US)

(73) Assignee: The Boeing Compoany, Chicago, IL (US)

( * ) Notice: Subject to any disclaimer, the term of this patent is extended or adjusted under 35 U.S.C. 154(b) by 465 days.

(21) Appl. No.: 13/101,251

(22) Filed: May 5, 2011

(65) Prior Publication Data

US 2012/0284237 A1 Nov. 8, 2012

(51) Int. Cl.
*G06F 17/30* (2006.01)
*G06F 21/55* (2013.01)

(52) U.S. Cl.
CPC ....... *G06F 17/30436* (2013.01); *G06F 21/554* (2013.01)

(58) Field of Classification Search
CPC ........... G06F 21/577; G06F 17/30082; G06F 21/00; G06F 21/54; G06F 21/566; G06F 17/30985; G06F 21/55; G06F 17/30436
USPC ......... 726/23, 22, 26, 30; 707/E17.014, 687, 707/690, 694
See application file for complete search history.

(56) References Cited

U.S. PATENT DOCUMENTS

| | | | |
|---|---|---|---|
| 7,444,331 B1 * | 10/2008 | Nachenberg et al. | |
| 2008/0034425 A1 * | 2/2008 | Overcash | G06F 21/55 726/22 |
| 2008/0040800 A1 | 2/2008 | Park | |
| 2012/0117644 A1 * | 5/2012 | Soeder | 726/22 |

OTHER PUBLICATIONS

Wikipedia Contributors, Code Injection, Apr. 22, 2011, 10 pages, ID: 425268016, Wikipedia, The Free Encyclopedia.
Halfond, W. et al., "A Classification of SQL Injection Attacks and Countermeasures", Proceedings of the IEEE International Symposium on Secure Software Engineering (ISSSE), XP007903777, Mar. 1, 2006, pp. 11pp.
Scott, D. et al., "Abstracting Application-Level Web Security", ACM WWW '02 Proceedings of the 11th International Conference on World Wide Web, May 7, 2002, pp. 396-407.
Bisht P. et al., "Candid: Dynamic Candidate Evaluations for Automatic Prevention of SQL Injection Attacks", ACM Transactions on Information and System Security, ACM, New York, NY, US, vol. 13, No. 2, XP-001574399, Feb. 1, 2010, pp. 14: 1-14:39.
Boyd S. et al., "SQLrand: Preventing SQL Injection Attacks", May 15, 2004, Applied Cryptography and Network Security; [Lecture Notes in Computer Science; LNCS], Springer-Verlag, Berlin/Heidelberg, pp. 292-302.

(Continued)

*Primary Examiner* — Boris Gorney
*Assistant Examiner* — Amanda Willis
(74) *Attorney, Agent, or Firm* — Armstrong Teasdale LLP (57) ABSTRACT

Methods and systems for use in validating input data in a computing system. Input data associated with a destination software application, such as a database, is received at a computing system. The input data is forwarded to an intermediate software application, such as a web application. When the input includes one or more patterns, a query produced by the intermediate software application based on the input data is validated, such as by comparing the structure of the query to one or more expected query structures. If the validation succeeds, the query is forwarded to the destination software application. Otherwise, the query is discarded.

14 Claims, 6 Drawing Sheets

(56) References Cited

OTHER PUBLICATIONS

Su, Z., et al., "The Essence of Command Injection Attacks in Web Applications", ACM POPL '06, Symposium on Principles of Programming Languages 2006, Jan. 11, 2006, Charleston, SC, USA, Retrieved from the Internet: URL:http://www.brianweb.net/misc/pop106.pdf.

Buehrer, G.T. et al., "Using Parse Tree Validation to Prevent SQL Injection Attacks", ACM SEM '05 Proceedings of the 5th International Workshop on Software Engineering and Middleware, Sep. 5, 2005, Lisbon, Portugal, Retrieved from the Internet: URL:http://delivery.acm.org/10.1145/1110000/1108496/p106-buehrer.pdf?ip=145.64.134.245&acc=ACTIVE.

European Extended Search Report for Application No. 12160070.4-2201, mailed Sep. 7, 2012.

* cited by examiner

METHODS AND SYSTEMS FOR VALIDATING INPUT DATA

BACKGROUND

The field of the disclosure relates generally to validating input data in a computing system and, more specifically, to methods and systems for use in selectively validating input data based on the presence of a pattern in the input data.

At least some known computing systems allow a client system to submit input data associated with a request, generate a query based on the input data, and execute the query in a database to provide a response to the client system. However, in such systems, a malicious user may execute an attack by submitting input data that "injects" executable code into the system, such as by including special characters and/or strings that manipulate the function of the system in the input data.

To prevent a code injection attack, at least some known computing systems validate input data and/or a query prior to executing such query in a database. However, by performing such validation each time input data is received, known validation methods may significantly increase computing resource (e.g., processor) utilization and/or introduce latency into the computing system. Computing resource utilization may be reduced by implementing relatively simple validation rules, but such simplification may produce unacceptable rates of false negative results (e.g., a failure to detect invalid input data) and/or false positive results (e.g., an erroneous identification of valid input data as invalid).

In addition, modifying a software application to prevent code injection attacks generally requires modification of the source code of the software application. In some scenarios, such as when using a proprietary software application or a legacy software application for which source code is no longer available, such modification may be infeasible or impossible.

BRIEF DESCRIPTION

In one aspect, a method for validating input data in a computing system. The method includes receiving, at a computing system, input data transmitted by a client computing device. A parsing component is activated by the computing system when the input data includes one or more predetermined patterns. A query that is based on the input data and associated with a database is received by the computing system from a software application. The query is validated by the computing system when the parsing component is activated. The query is not validated by the computing system when the parsing component is not activated. The query is discarded by the computing system when the validating fails.

In another aspect, a system for validating input data in a computing system is provided. The system includes a memory, a communications unit, and a processor unit that is coupled to said memory and said communications unit. The memory is configured to store one or more patterns. The communications unit is configured to receive input data associated with a destination software application from a client computing device. The processor unit is programmed to activate a parsing component when the input data includes at least one of the patterns and to forward the input data to an intermediate software application. The processor unit is also programmed to receive from the intermediate software application a query based on the input data, to validate the query when the parsing component is activated, and to forward the query to the destination software application when the validating succeeds.

In yet another aspect, one or more computer-readable media having computer-executable components are provided. The components include a filter component and a parsing component. When executed by at least one processor unit, the filter component causes the processor unit to receive input data associated with the software application, to forward the input data to the software application, and to determine whether the input data includes one or more predetermined patterns. When executed by at least one processor unit, the data combination component causes the processor unit to receive a query from the software application, wherein the query is based on the input data and is associated with a database, to validate the query when the input data includes one or more of the predetermined patterns, to discard the query when the validation fails, and to forward the query to the database when the validation succeeds.

The features, functions, and advantages that have been discussed can be achieved independently in various embodiments or may be combined in yet other embodiments further details of which can be seen with reference to the following description and drawings.

DETAILED DESCRIPTION

The described embodiments are directed to selectively validating generated queries, such as database queries, when input data includes one or more suspicious patterns. Input data may be received from a user and/or from an automated system. Further, a repository of expected query structures may be created based on generated queries, and a future generated query may be validated at least in part by parsing the query to create a query structure and checking the created query structure against the repository. When the query structure does not match any expected query structure, the query may be discarded (e.g., not executed in a database).

Embodiments provided herein facilitate detecting and defending against code injection attacks without subjecting every client submission and/or query to resource-intensive validation. Further, the embodiments described enable a repository of expected query structures to be created based on normal operation of a software application and for this repository to be used in validating subsequent client submissions and/or queries. Moreover, the methods described herein may be practiced without requiring modification to the source code of a software application. Rather, for example, suspicious pattern detection and query validation may be performed by one or more software components other than the software application being protected.

For illustrative purposes, embodiments are described in the context of Structured Query Language (SQL) injection attacks that are intended to operate against a database. More specifically, such embodiments involve a software application, such as a web application and/or a web service, that accesses (e.g., stores and retrieves) data in a database by generating and executing SQL statements in response to requests received from client devices. Further, generated SQL statements may include parameters that are populated based on input data from a client device. In the absence of protective measures, such as those described herein, the software application may be manipulated to execute SQL statements of an attacker's choosing by injecting SQL code in the input data. While embodiments are described with reference to SQL injection, it is contemplated that the methods and systems described herein are operable to detect any type of code injection attack that adds code to input data transmitted to an intermediate software application (e.g., a web application) to cause the execution of such code by a destination software application (e.g., a database).

The goal of a SQL injection attack is to manipulate a software application to run SQL code that performs a mission that was not originally intended for the software application. It is an instance of a more general class of vulnerabilities that can occur whenever one programming or scripting language is embedded inside another (code injection). By manipulating the inputs from client computing devices (e.g., web clients), the attacker can gain unauthorized access, possibly with administrator privileges, and cause tampering or loss of services.

Figure 1:
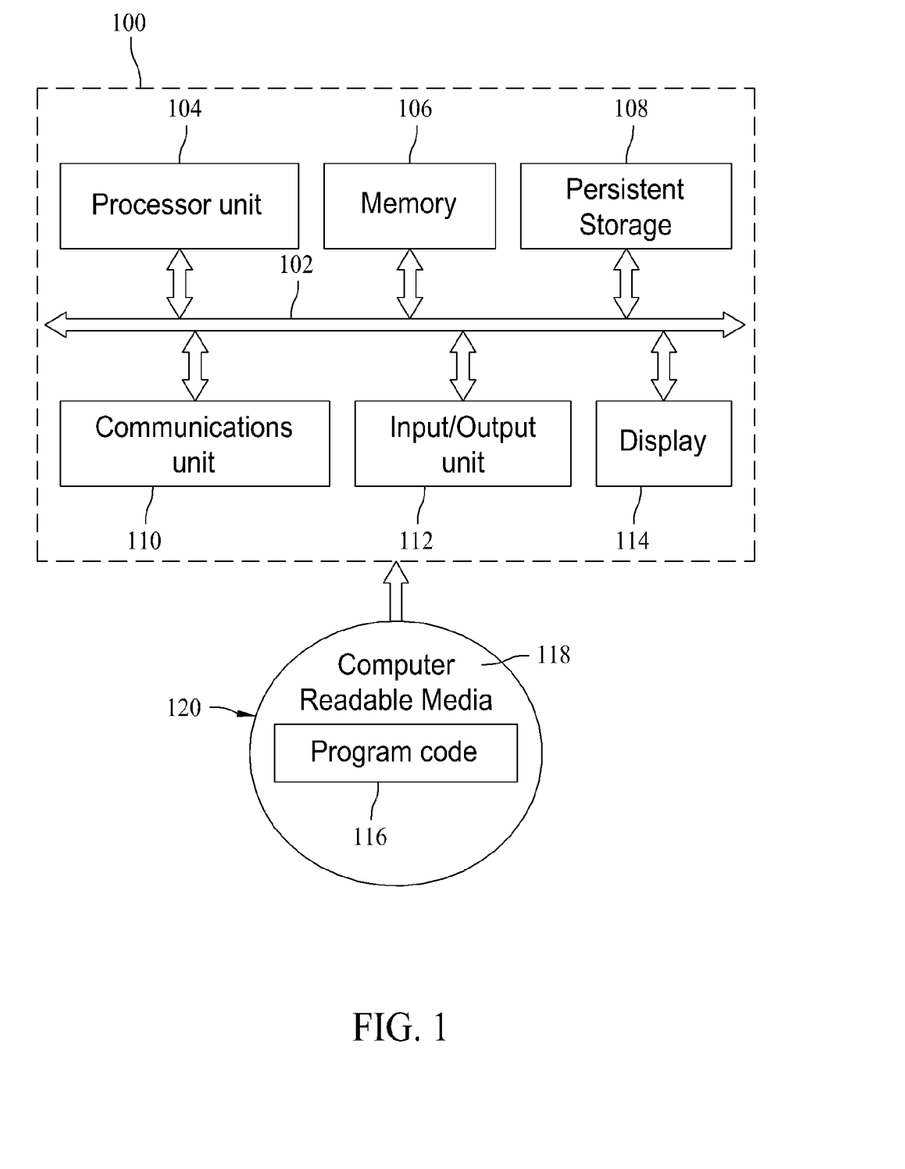
FIG. 1 is a block diagram of an exemplary computing device.

FIG. 1 is a block diagram of an exemplary computing device 100. In the exemplary embodiment, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., filter components, parsing components, structure collector components, and/or notification components), suspicious input data patterns, expected query structures, input data, and/or any other information suitable for use with the methods described herein.

Communications unit 110, in these examples, provides for communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer-readable media, such as memory 106 or persistent storage 108.

Program code 116 is located in a functional form on non-transitory computer-readable media 118 that is selectively removable and may be loaded onto or transferred to computing device 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to computing device 100. The tangible form of computer-readable media 118 is also referred to as computer recordable storage media. In some instances, computer-readable media 118 may not be removable.

Alternatively, program code 116 may be transferred to computing device 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer-readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include a filter component, a parsing component, a structure collector component, a notification component, and/or any component suitable for the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer-readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
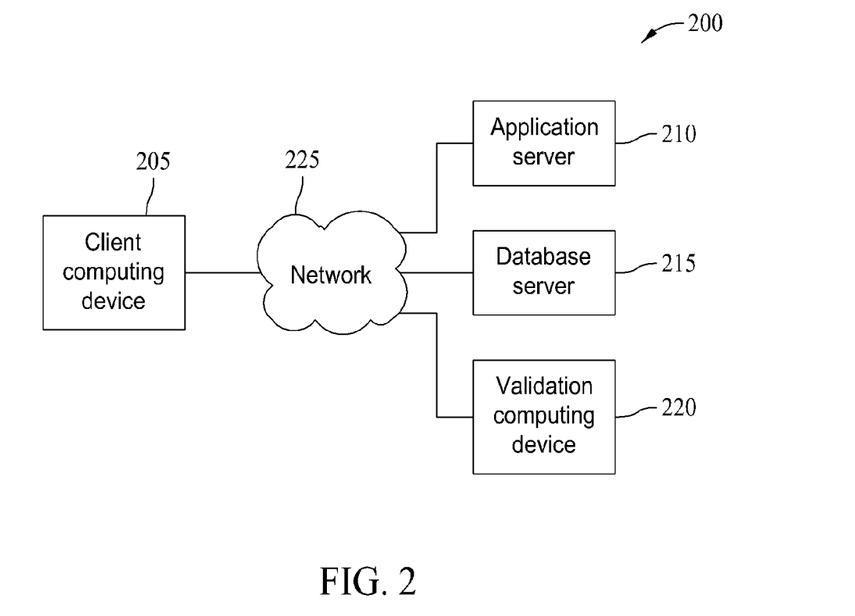
FIG. 2 is a block diagram illustrating an exemplary computing system for use in validating input data.

FIG. 2 is a block diagram illustrating an exemplary computing system 200 for use in validating input data. System 200 includes a client computing device 205, an application server 210, a database server 215, and a validation computing device 220 coupled in communication via a network 225. Network 225 may include, without limitation, a local area network (LAN), a wide area network (WAN), and/or the Internet. Client computing device 205, application server 210, database server 215, and/or validation computing device 220 may be separate examples of computing device 100 (shown in FIG. 1) and/or may be integrated with each other.

In exemplary embodiments, application server 210 executes an intermediate software application, such as a web application. The intermediate software application provides access to data and/or services provided by a destination application, such as a database executed by database server 215. In some embodiments, the intermediate software application communicates with a client application, such as a web browser, executed by client computing device 205.

To access data from the destination software application, client computing device 205 transmits a request to application server 210 via network 225. The request may include input data, such as parameters for use by the software application in responding to the request. For example, if the request represents a login request, the input data may include a username and a password. The request may further include a resource identifier, such as a uniform resource locator (URL), a path, a function name, and/or a keyword, that refers to a target resource or service that client computing device 205 is attempting to access at application server 210. For example, a URL of "http://server/login" may be associated with a login page, and a URL of "http://server/events" may be associated with an events listing page.

As described in more detail below, the intermediate software application at application server 210 receives the request from client computing device 205, generates a query based on the request, and transmits the query to the destination software application (e.g., the database at database server 215). In exemplary embodiments, the query is an SQL query to be executed by database server 215, which returns results from the query to application server 210. Application server 210, in turn, transmits the results to client computing device 205, such as by formatting the results in a web page.

The operation of application server 210 and/or database server 215 may be modified by a malicious user or "attacker" by manipulating input data submitted with a request. Such manipulation is referred to as a SQL injection attack.

As an example, a login page of a web phonebook application may accept a user identifier (ID) and a password submitted by a client and generate an SQL query based on the submitted values. If the user ID submitted is "Tintin" and the password is "secret", the application may generate a query like "SELECT * FROM phonebook WHERE userID='Tintin' AND password='secret'" to retrieve and present user data. In this example, if an attacker enters a user ID of "Tintin' OR 132 1--", the generated query may be "SELECT * FROM phonebook WHERE userID='Tintin' OR 1=1--' AND password='secret'". Notably, in SQL syntax, a double hyphen ("--") indicates the beginning of a comment, which is disregarded by the database executing the query. Accordingly, the password constraint, which now follows the double hyphen, is disabled, bypassing password checking. Further, because the constraint "1=1" (which is always true) is added in the disjunctive with the user ID constraint, the database may return all the entries that are eventually displayed to the attacker in a web browser, leading to compromise of confidentiality and privacy breach.

Figure 3:
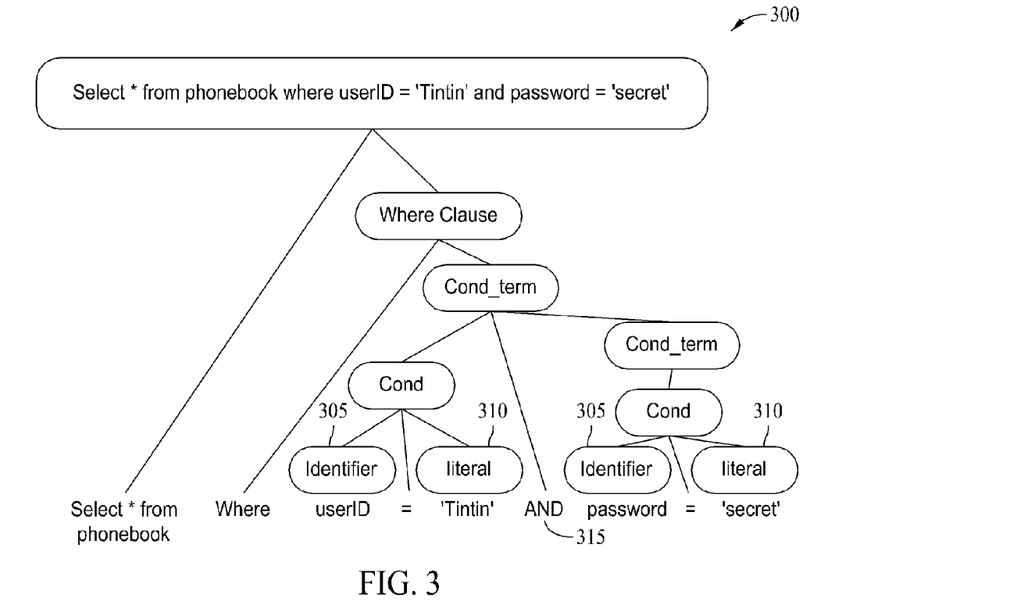
FIG. 3 is a diagram of a query structure representing a valid query.
Figure 4:
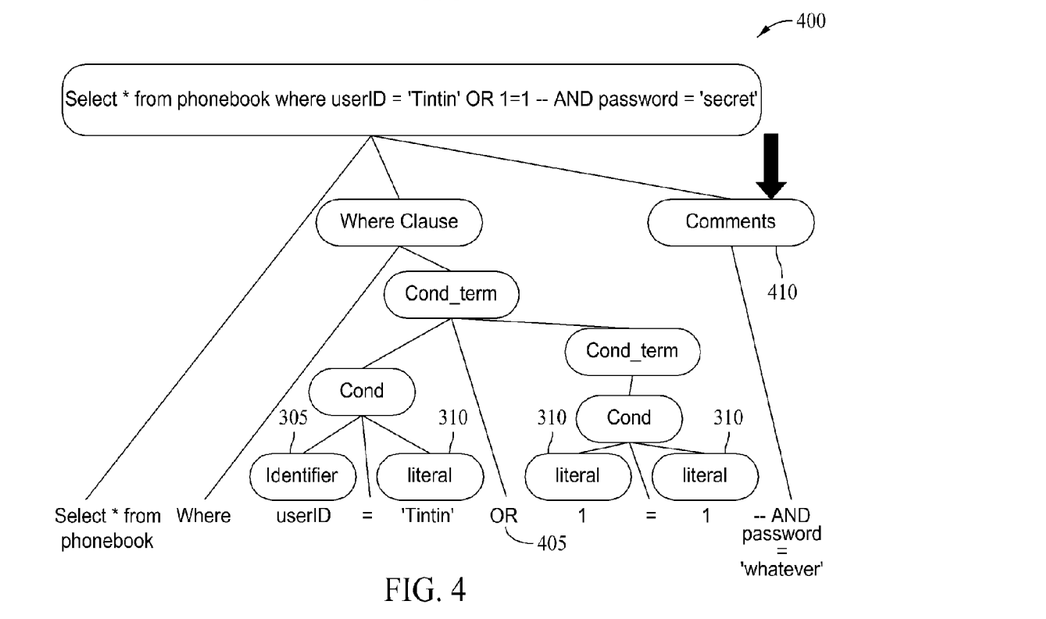
FIG. 4 is a diagram of a query structure representing a manipulated, or invalid, query.

A diagnostic feature of SQL injection attacks is that they change the structure of SQL queries. FIG. 3 is a diagram 300 of a query structure representing the valid query above. FIG. 4 is a diagram 400 of a query structure representing the manipulated, or invalid, query above. As shown in diagram 300, the valid query includes two comparisons of an identifier 305 (e.g., a column name) to a literal value 310. The two comparisons are combined with a logical conjunction 315 ("AND"). In contrast, the invalid query structure depicted by diagram 400 includes one comparison of an identifier 305 to a literal value 310 and one comparison of a literal value 310 to another literal value 310. The two comparisons are combined with a logical disjunction 405, as opposed to a logical conjunction 315. Further, the invalid query structure includes a comment 410 that is not present in the valid query structure shown in diagram 300.

Query structure analysis, such as comparing the structure of a generated query to one or more expected query structures, may be performed by validation computing device 220 to detect code injection (e.g., SQL injection) attacks. Further, to reduce the computing resource utilization and/or latency that may be associated with query structure analysis, validation computing device 220 may perform such query structure analysis only when a suspicious pattern appears in the input data. For example, a suspicious pattern may include a single character (e.g., a single quotation mark, as shown in the example above), a string of multiple characters (e.g., a double hyphen), a regular expression, a wildcard expression, and/or any other expression suitable for indicating a risk of a code injection attack in input data. Suspicious patterns may be predetermined and stored at validation computing device 220 (e.g., in memory 106 or persistent storage 108, shown in FIG. 1).

In some embodiments, validation computing device 220 is configured to operate as a proxy between client computing device 205 and application server 210, and to also operate as a proxy between application server 210 and database server 215. For example, requests from client computing device 205 to application server 210 may be routed to validation computing device 220, which forwards the requests to application server 210. Similarly, queries directed to database server 215 by application server 210 may be routed to validation computing device 220 and selectively forwarded to database server 215.

Figure 5:
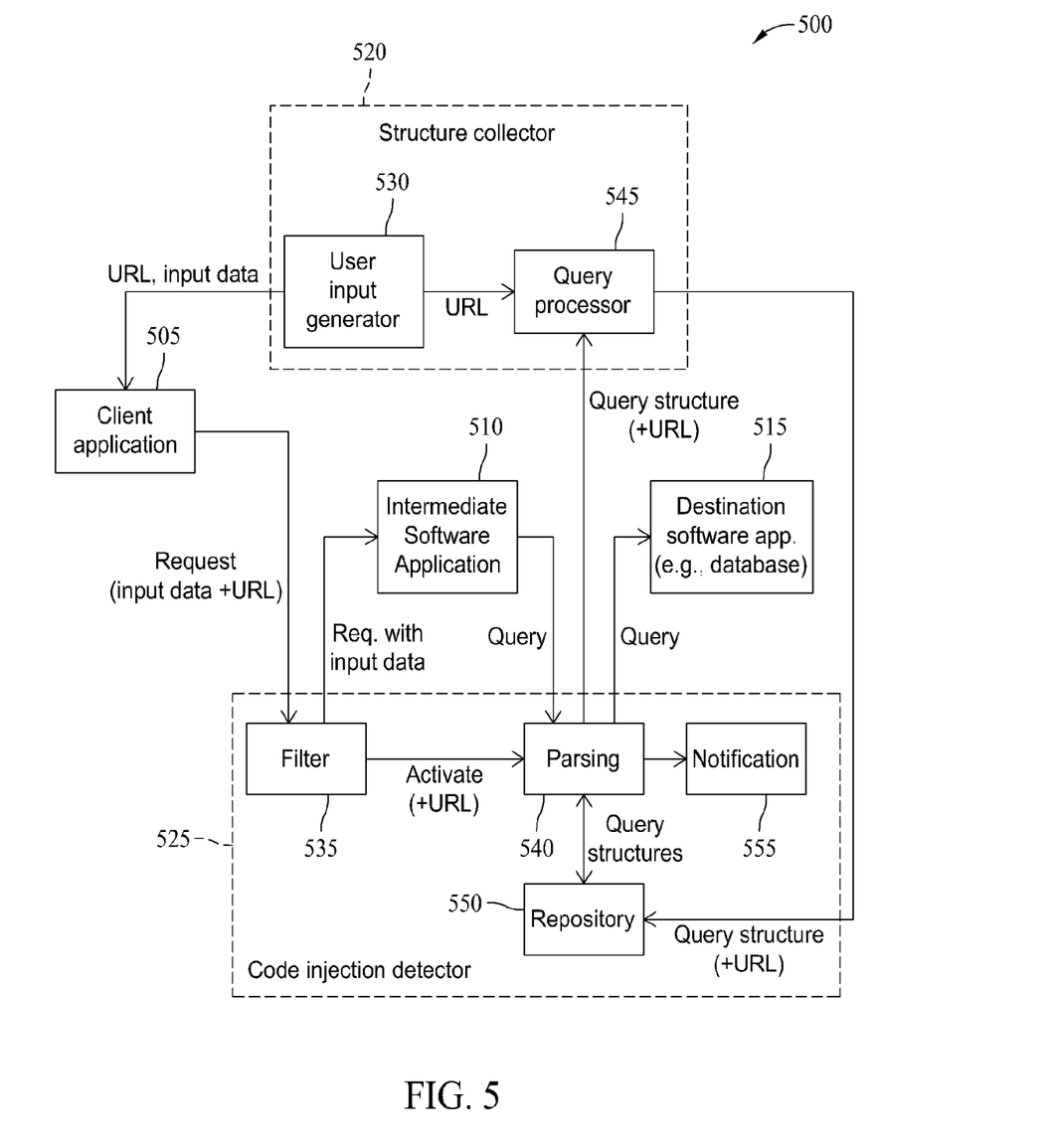
FIG. 5 is a block diagram of software components in the system shown in FIG. 2.

FIG. 5 is a block diagram 500 of software components in system 200 (shown in FIG. 2). Referring to FIGS. 2 and 5, in exemplary embodiments, a client application 505 (e.g., a web browser) is executed by client computing device 205, an intermediate software application 510 is executed by application server 210, and a destination software application 515 (e.g., a database) is executed by database server 215. Validation computing device 220 executes a structure collector component 520 and a code injection detector component 525.

Figure 6:
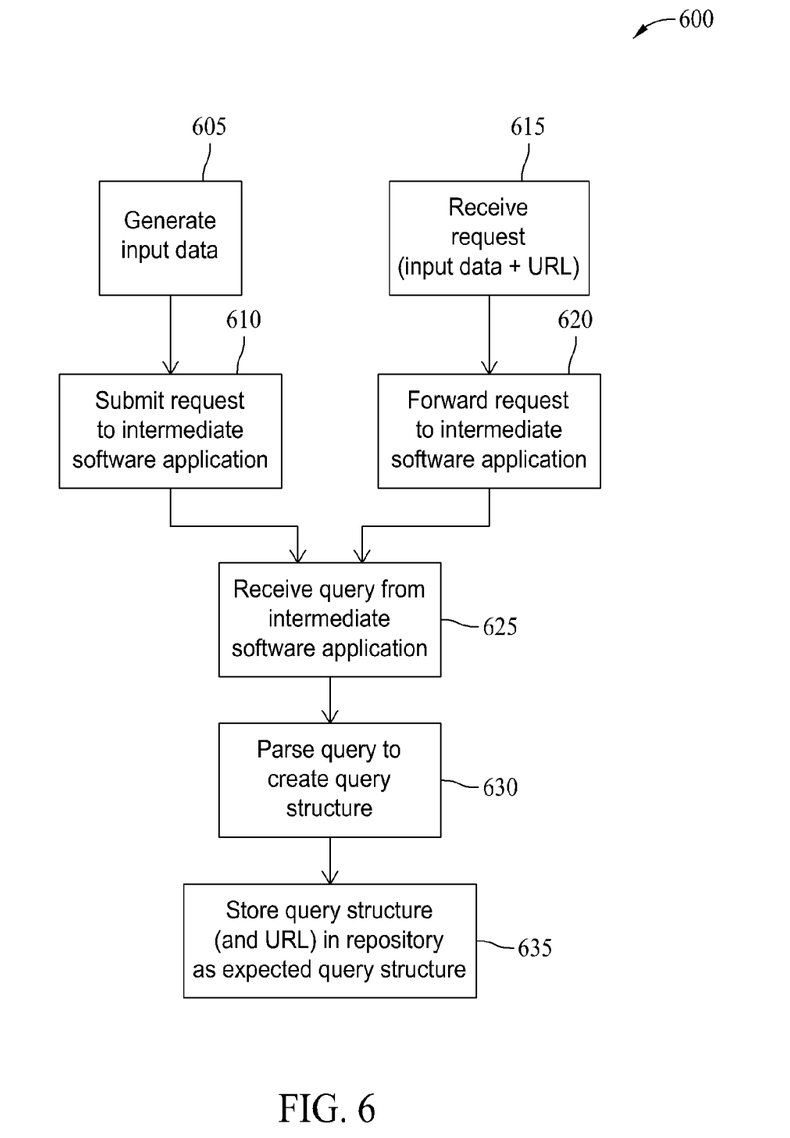
FIG. 6 is a flowchart of an exemplary method for use in collecting expected query structures.
Figure 7:
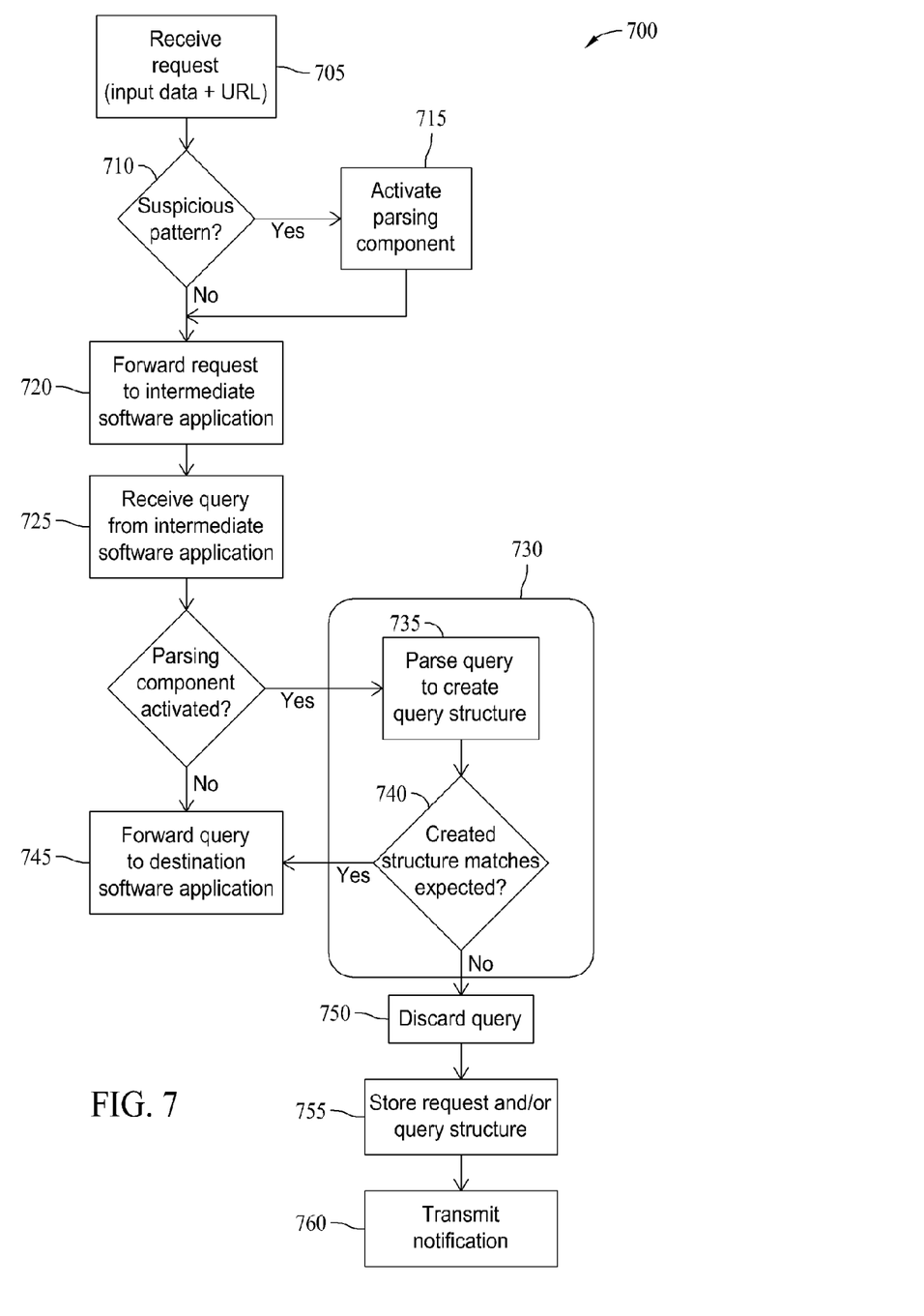
FIG. 7 is a flowchart of an exemplary method 700 for use in determining whether a request represents a code injection attack.

FIG. 6 is a flowchart of an exemplary method 600 for use in collecting expected query structures. FIG. 7 is a flowchart of an exemplary method 700 for use in determining whether a request from client computing device 205 represents a code injection attack. In exemplary embodiments, method 600 is performed by structure collector component 520, and method 700 is performed by code injection detector component 525.

Expected query structures may be collected based on trusted input data, either generated by software or received from trusted users (e.g., during testing and/or training) Referring to FIGS. 5 and 6, in exemplary embodiments, a user input generator component 530 generates 605 input data that represents valid user input associated with intermediate software application 510. For example, the input data may include test data used to validate the operation of intermediate software application 510. User input generator component 530 provides the input data and a resource indicator (e.g., a URL) client application 505, which submits 610 a request, including the input data and the resource indicator, to intermediate software application 510. Alternatively, user input generator component 530 may directly submit 610 the request to intermediate software application 510. The request is received by intermediate software application 510, either directly from client application 505 and/or user input generator component 530, or via a filter component 535 included in code injection detector component 525.

In addition, or alternative to, generated input data from user input generator component 530, a request may include input data entered by a user of client application 505. In such embodiments, filter component 535 receives 615 the request and forwards 620 the request to intermediate software application 510. Alternatively, the request may be received 615 directly by intermediate software application 510 without forwarding 620 by filter component 535.

Regardless of the source of the input data, upon receiving the request, intermediate software application 510 generates a query based on the request (e.g., based on the input data and/or the resource indicator). For example, the query may include parameters that are populated based on one or more values included in the input data. Intermediate software application 510 transmits the query, which is received 625 by a parsing component 540 of code injection detector component 525.

Parsing component 540 parses 630 the query to create an expected query structure, an example of which is illustrated in FIG. 3. For example, parsing component 540 may parse 630 the query at least in part by determining a relationship of commands (e.g., select, update, and/or delete), data sources (e.g., tables), identifiers (e.g., column names), clauses, conditions, operators (e.g., comparisons, logical conjunctions, and/or logical disjunctions), literal values, and/or comments within the query.

Parsing component 540 provides the query structure to a query processor component 545 within structure collector component 520. Query processor component 545 also receives the resource indicator (e.g., URL) corresponding to the request from which the query structure was generated from user input generator component 530. In addition, or alternative to, the resource indicator may be provided with the query structure by parsing component 540. For example, if a request is forwarded 620 by filter component 535, filter component 535 may provide the resource indicator to parsing component 540 after receiving 615 the request, and parsing component 540 may associate the resource indicator with the query when it is received 625 from intermediate software application 510.

Query processor component 545 stores 635 the expected query structure in a repository 550 maintained within code injection detector component 525. In some embodiments, storing 635 the expected query structure includes associating the expected query structure with the corresponding resource indicator.

In exemplary embodiments, method 600 is repeated to create a plurality of expected query structures, each of which may be associated with a resource indicator. Further, multiple expected query structures may be associated with a single resource indicator in repository 550.

When expected query structures associated with intermediate software application 510 have been stored 635, code injection detector component 525 may be used to detect and/or prevent code injection attacks. Referring to FIGS. 5 and 7, in exemplary embodiments, filter component 535 receives 705 a request, including input data and a resource indicator, transmitted by client application 505. The input data may be entered by a user at client computing device 205 (shown in FIG. 2).

Filter component 535 determines 710 whether the input data includes one or more predetermined suspicious patterns. For example, the content of the input data may be inspected to determine 710 whether any predetermined character, string of multiple characters, regular expression, and/or wildcard expression is included in the input data. If so, filter component 535 activates 715 parsing component 540, optionally providing the resource indicator included in the request to parsing component 540. Regardless of whether a suspicious pattern is detected, filter component 535 forwards 720 the request to intermediate software application 510, which generates a query based on the forwarded request (e.g., input data and/or resource indicator). The query is associated with (e.g., directed to) destination software application 515 (e.g., a database).

Parsing component 540 receives 725 the generated query from intermediate software application 510. If parsing component 540 has been activated 715 by filter component 535, parsing component 540 validates 730 the generated query. In exemplary embodiments, the generated query is not validated 730 when parsing component 540 is not activated 715.

In exemplary embodiments, parsing component 540 validates 730 the generated query by parsing 735 the received query to create a query structure, such as described above with reference to FIG. 6. Parsing component 540 further determines 740 whether the created query structure matches one or more expected query structures.

In some embodiments, parsing component 540 determines 740 whether the created query structure matches any expected query structure associated with intermediate software application 510 in repository 550. In other embodiments, the input data is associated with a resource indicator, and parsing component 540 selects one or more expected query structures from repository 550 based on the resource indicator. For example, parsing component 540 may select only expected query structures that are associated with the resource indicator. Parsing component then determines 740 whether the created query structure matches any of the selected expected query structures.

When parsing component 540 is not activated 715 (e.g., when the input data includes none of the predetermined suspicious patterns), or when validation 730 succeeds (e.g., parsing component 540 determines 740 that a created query structure matches an expected query structure), parsing component 540 forwards 745 the query to destination software application 515. Destination software application 515 executes the query and returns one or more results, which are returned to intermediate software application 510. Intermediate software application 510 transmits the results (e.g., formatted in a web page) to client application 505.

When validation 730 fails (e.g., parsing component 540 determines 740 that a created query structure does not match an expected query structure), parsing component 540 discards 750 the query, preventing destination software application 515 from executing code injected by an attacker.

Further, in some embodiments, parsing component 540 stores 755 the created query structure and, optionally, the resource indicator in repository 550 as an invalid query structure, which may later be inspected by security personnel, for example. Moreover, in some embodiments, parsing component 540 provides the query structure and/or resource indicator to a notification component 555, which transmits 760 a potential attack notification to a user (e.g., security personnel) and/or an automated monitoring system.

Embodiments described herein enable the detection and prevention of code injection attacks, such as SQL injection attacks, in a system that includes an intermediate software application and a destination software application. Such embodiments also facilitate selectively validating queries generated by an intermediate software application based on whether input data from a client application includes one or more suspicious patterns. The methods and systems described herein provide code injection protection even in scenarios where modifying the intermediate software application is infeasible (e.g., due to the risk of introducing defects) or is impossible (e.g., due to the unavailability of source code).

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for validating input data in a computing system, said method comprising:
   receiving, at a validation computing system, at least one input string from a client computing device;
   performing, by the validation computing system, a first validation step, wherein the first validation step includes comparing the at least one input string to a plurality of predetermined patterns;
   forwarding, by the validation computing system, the at least one input string to an application server, wherein the application server is configured to populate a query based on the at least one input string, the query associated with a database;
   receiving, by the validation computing system, the query from the application server;
   sending, by the validation computing system when the first validation step identifies that the at least one input string is valid, the query to the database for execution and returning a result of the executed query to the client computing device;
   performing, by the validation computing system when the first validation step identifies that the at least one input string is invalid, a second validation step, wherein the second validation step includes analyzing a structure of the query;
   sending, by the validation computing system when the second validation step identifies that the query is valid, the query to the database for execution and returning the result of the executed query to the client computing device; and
   discarding, by the validation computing system, the query when the second validation step identifies that the query is invalid.

2. A method in accordance with claim 1, wherein the second validation step comprises:
   parsing the query to create a query structure; and
   determining whether the created query structure matches one or more expected query structures.

3. A method in accordance with claim 2, wherein the created query structure is based on a second query received at a second time, said method further comprising:
   generating input data to create a first query at a first time before the second time, wherein the generated input data represents valid user input; and
   parsing the first query to create an expected query structure.

4. A method in accordance with claim 1, further comprising transmitting, by the validation computing system, a potential attack notification to at least one of a user and an automated monitoring system when the second validation step identifies that the query is invalid.

5. A method in accordance with claim 1, wherein the input data is associated with a resource indicator, and wherein the second validation step further comprises:
selecting one or more expected query structures that are associated with the resource indicator; and
determining whether the created query structure matches one or more of the selected expected query structures.

6. A system for validating input data in a computing system, said system comprising:
a storage device configured to store a plurality of predetermined patterns;
a communications unit configured to receive at least one input string associated with a destination software application from a client computing device; and
a processor unit coupled to said storage device and said communications unit, wherein said processor unit is programmed to:
perform a first validation step, wherein the first validation step includes comparing the at least one input string to the plurality of predetermined patterns;
forward the at least one input string to an intermediate software application, wherein the intermediate software application is configured to populate a query based on the at least one input string, the query associated with the destination software application;
receive the query from the intermediate software application;
send, when the first validation step identifies that the at least one input string is valid, the query to the destination software application for execution and return a result of the executed query to the client computing device;
perform, when the first validation step identifies that the at least one input string is invalid, a second validation step, wherein the second validation step includes analyzing a structure of the query;
send, when the second validation step identifies that the query is valid, the query to the destination software application for execution and return the result of the executed query to the client computing device; and
discard the query when the second validation step identifies that the query is invalid.

7. A system in accordance with claim 6, wherein the destination software application includes a database, said processor unit is programmed to perform the second validation step at least in part by validating a database query received from the intermediate software application.

8. A system in accordance with claim 6, wherein said communications unit is configured to receive the at least one input string at least in part by receiving input data entered by a user at the client computing device.

9. A system in accordance with claim 6, wherein said storage device is further configured to store a plurality of expected query structures, wherein each expected query structure is associated with a resource indicator, said processor unit is programmed to perform the second validation step at least in part by:
parsing the query to create a query structure;
selecting one or more expected query structures based on the resource indicator associated with the input data; and
determining whether the created query structure matches one or more of the selected expected query structures.

10. A system in accordance with claim 9, wherein said processor unit is further programmed to:
receive a plurality of first queries generated by the intermediate software application based on input data that represents valid user input; and
parse the received first queries to create the plurality of expected query structures.

11. One or more non-transitory computer-readable media having computer-executable components, said components when executed by at least one processor unit cause the processor unit to:
receive at least one input string from a client computing device;
perform a first validation step, wherein the first validation step includes comparing the at least one input string to a plurality of predetermined patterns;
forward the at least one input string to an intermediate software application, wherein the intermediate software application is configured to populate a query based on the at least one input string, the query associated with a destination software application;
receive the query from the intermediate software application;
send, when the first validation step identifies that the at least one input string is valid, the query to the destination software application for execution and return a result of the executed query to the client computing device;
perform, when the first validation step identifies that the at least one input string is invalid, a second validation step, wherein the second validation step includes analyzing a structure of the query;
send, when the second validation step identifies that the query is valid, the query to the destination software application for execution and return the result of the executed query to the client computing device; and
discard the query when the second validation step identifies that the query is invalid.

12. One or more non-transitory computer-readable media in accordance with claim 11, wherein said computer-executable components further when executed by the at least one processor unit cause the processor unit to transmit a potential attack notification to at least one of a user and an automated monitoring system when the second validation step identifies that the query is invalid.

13. One or more non-transitory computer-readable media in accordance with claim 11, wherein said components when executed further cause the processor unit to store discarded queries in a repository.

14. One or more non-transitory computer-readable media in accordance with claim 11, wherein said computer-executable components when executed by at least one processor unit further cause the processor unit to parse a plurality of first queries received from the intermediate software application to create a plurality of expected query structures, and to perform the second validation step at least in part by:
parsing the query to create a query structure; and
determining whether the created query structure matches one or more of the expected query structures.

* * * * *